E. SOKAL.
NEGATIVE POLE ACCUMULATOR ELECTRODE.
APPLICATION FILED AUG. 22, 1907.
905,599.
Patented Dec. 1, 1908.
2 SHEETS—SHEET 1.
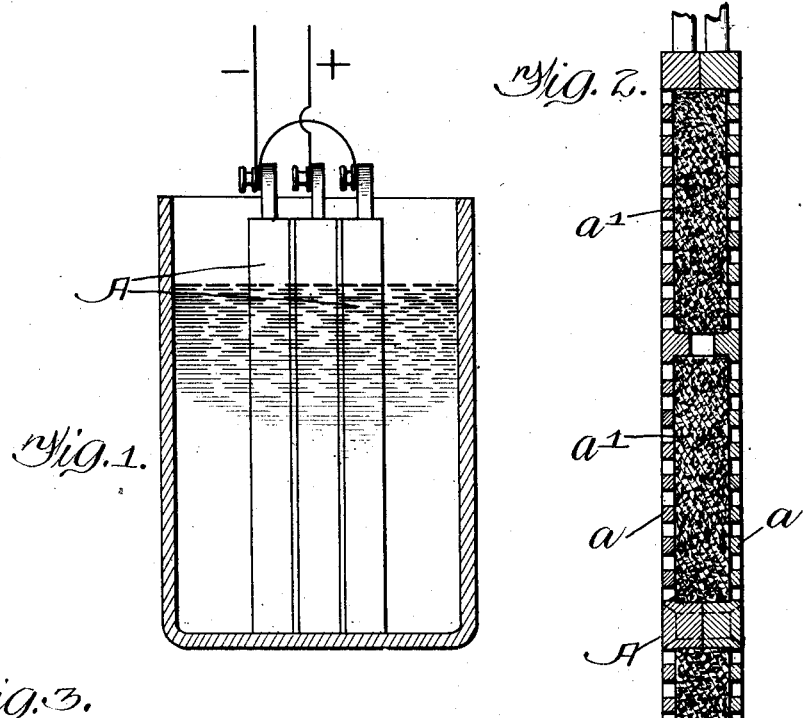
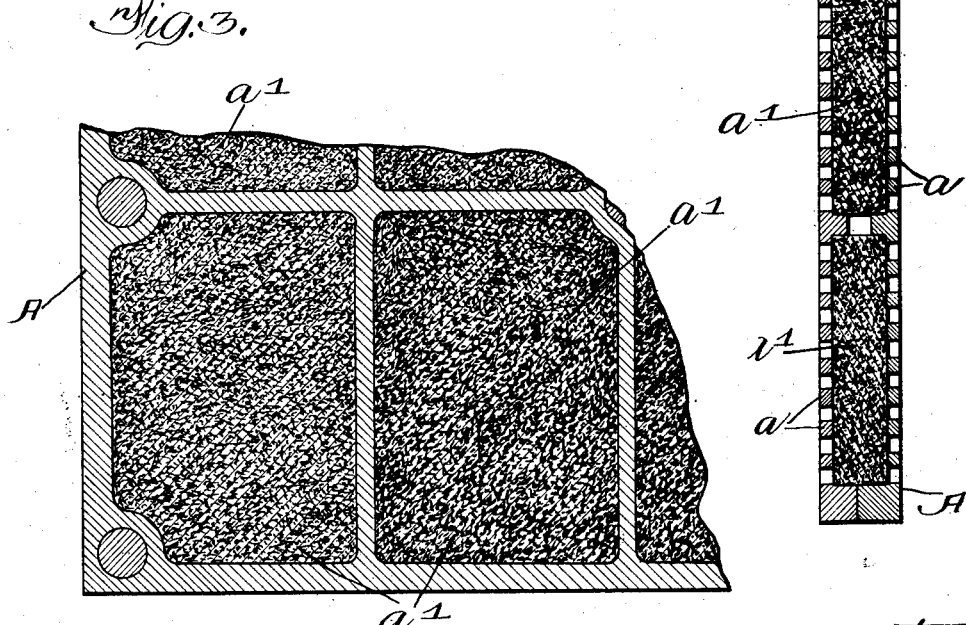

E. SOKAL.
NEGATIVE POLE ACCUMULATOR ELECTRODE.
APPLICATION FILED AUG. 22, 1907.
905,599.
Patented Dec. 1, 1908.
2 SHEETS—SHEET 2.
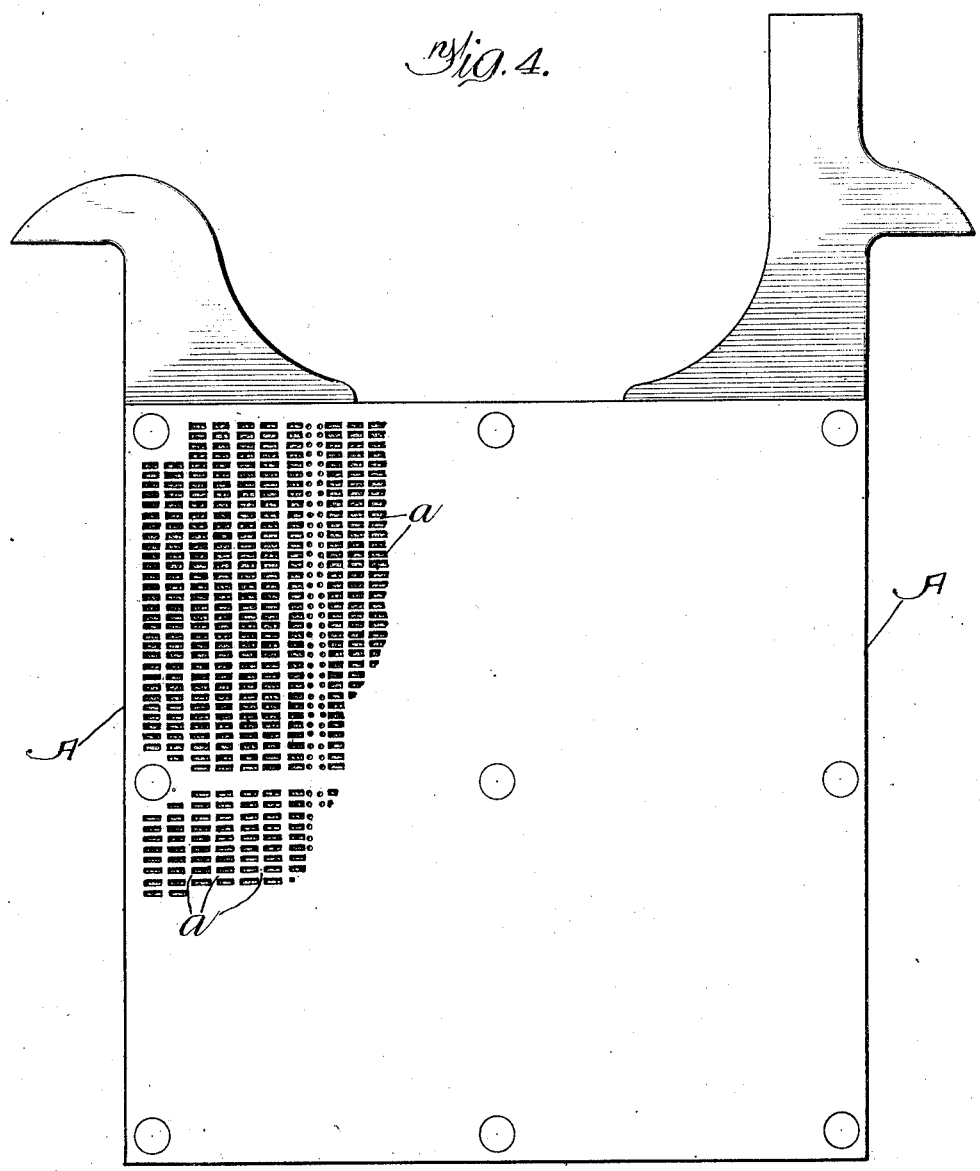

UNITED STATES PATENT OFFICE.

EDWARD SOKAL, OF CHICAGO, ILLINOIS.

NEGATIVE-POLE ACCUMULATOR-ELECTRODE.

No. 905,599.    Specification of Letters Patent.    Patented Dec. 1, 1908.

Application filed August 22, 1907. Serial No. 389,683.

*To all whom it may concern:*

Be it known that I, EDWARD SOKAL, a citizen of Austria-Hungary, and resident of Chicago, Cook county, Illinois, have invented a certain new and useful Improvement in Negative-Pole Accumulator-Electrodes, of which the following is a specification.

In the manufacture of storage batteries, it has become known that the shrinkage of the negative active material, and the subsequent loss of capacity, can be prevented by adding to the active material certain inert substances. For example, finely divided carbon, china-clay, cellulose and pumice stone have been proposed for that purpose, and the use of these materials has been described in the work of Dr. Sieg *Die Accumulatoren* Leipsig Verlag S. Hirsel 1901. The use of these substances has been known, but no general law was known which explained the difference of behavior of the negative active material in contact with these substances, and which would enable a chemist or one skilled in the art to determine generally what substances were suitable for that purpose. Furthermore, it was discovered that most of these substances, such as pumice-stone, cellulose, and china-clay, are decidedly inferior to finely divided carbon or lamp black, when employed for the purpose indicated. In addition, it was known that these substances, and more particularly the finely divided carbon, would produce an objectionable local action on the negative active material, resulting in its deterioration, which action is easily explained in the case of the finely divided carbon by the fact that such material is electrochemically active—that is to say, the carbon forms a galvanic couple with the negative active material. Such local action is, of course, undesirable, and such action becomes the more objectionable in its effects the greater the quantity of added inactive material. It is well known, also, that the use of such additions results in the disintegrating and loosening of said negative active material, so that it is liable to expand outwardly from the grid and finally fall off. Inasmuch as the use of mere retaining perforated sheets proved unsatisfactory, because the material inclosed in the perforated envelop would not expand against the resistance opposed to its growth by the perforated walls, grids have been devised in which the negative active material having inert substances added thereto is caused to only partially fill the receptacles or spaces or compartments of the grid, so as to afford space or room for future expansion. See, for example, Patent Number 781,745, granted February 7, 1905, for improvement in negative pole plate. Also, German Patent Number 153,139, granted July 5, 1904. Obviously, however, this arrangement is characterized by certain disadvantages, inasmuch as the active material is not, at the beginning of the operation, in good electrical contact with the grid, and is dependent for such contact upon the more or less irregular expansion caused by the addition of inactive substances. After considerable scientific investigation, I find that the reason why such inactive additions prevent the shrinkage of the negative active material, is not a changed behavior of the negative active material, but simply the gassing which must occur thereon and around the finely divided particles thereof at the passage of the electrical current during the charge; and if the addition, such as carbon, forms a galvanic couple with the negative active material, then this is also true during rest and discharge. Based on this scientific investigation, I also discovered that a substance can be used for preventing shrinkage of the negative active material, and for preventing the subsequent loss of capacity, which substance heretofore has not been known to be suitable for this purpose, namely finely divided lead dust, employed as an admixture to the negative active material. Such substance, I find, offers many advantages, for lead dust is chemically nearly identical with the negative active material, and for this reason causes practically no local action of the active material. Furthermore, lead dust is a good conductor and does not increase the resistance of the electrode, nor does it make its composition heterogeneous. Again, the gassing around its particles occurs only during the charge, and is limited to that time, and hence its action occurs at the time when it is most needed, namely when the dissolution of spongy lead takes place by reason of the greater concentration of the electrolyte in the pores, and not during the discharge and rest of the battery. I also find that lead dust can be used either by itself or in combination with finely divided carbon, and in the latter case it permits the user to dispense with more than half of the carbon or lamp-black which otherwise would be necessary to obtain the desired effect. In addition, I find that with the admixture of lead dust in the negative active material the pressure due to the growth and expansion of the negative active material is sufficiently strong and regular to permit the user to dispense with any grid arrangement in which the paste is caused to only partially fill the cavities. In fact, I find that with the addition of lead dust to the negative active material, an ordinary grid with pellets completely filling the compartments, and with a retaining perforated envelop of sufficient thickness, the battery works satisfactorily, and the contained negative active material does not show any shrinkage, which result was heretofore not possible. In this way an obvious economy of space is obtained, as distinguished from the devices heretofore employed, and the electrode is not dependent for a good contact of the negative active material with the grid upon the effect of the inactive admixtures. Obviously, it will make no essential difference in the carrying out of my invention whether the retaining envelop is made of hard rubber, lead, or some other suitable material, and if it is made of lead, which I find is a good material because of its good conductivity, it may be cast in one piece with the grid, or riveted or burned thereto.

In the accompanying drawings, Figure 1 is a diagram of a storage battery having negative-pole plates A, embodying the principles of my invention. Fig. 2 is an enlarged vertical section of one of said plates. Fig. 3 is a face view of a fragment of the plate, showing the grid and sections of active material in section. Fig. 4 is a face view or side elevation of the plate on a smaller scale.

As thus illustrated, the said battery can be of any suitable, known or approved construction. The negative-pole plates A are, however, provided with a negative active material containing lead dust as an admixture thereto. The said negative active material may be prepared or mixed in any suitable manner, and the lead dust is preferably two per cent. of the entire quantity of paste. The materials for the paste can all be mixed dry, including the two per cent. of lead dust, and the liquid can then be added to the mixture. Negative active material (sponge lead) of this character does not tend to shrink even if completely covered by an envelop, while the envelop prevents its expansion outside of the grid during use of the battery. The lead dust does not produce any local action on the negative active material, and I thus prevent shrinkage and expansion and consequent loss of capacity, in the manner and for the reasons previously explained.

As illustrated, each negative-pole plate A comprises a pair of perforated plates $a$, provided on their inner or meeting surfaces with ridges or other formations suitable for providing pockets or cavities for holding the pellets or sections $a^1$ of the negative active material, which latter are prepared in the manner stated. The said pellets or sections of the said active material, when thus inclosed in a perforated lead envelop, are in good electrical contact with the grid, and such contact does not change, as the negative active material does not shrink and cannot freely and deleteriously expand, there being, therefore, no consequent loss of capacity. By using the lead dust, the conductivity of the plate or electrode is not reduced, as previously explained.

As I say, I find that good results are obtained when lead dust is employed in the proportion of two per cent. of the entire quantity of paste. It is obvious, however, that the proportions can be varied without departing from the spirit of my invention. Broadly considered, it will be seen that my invention consists of a negative active material having an admixture of lead dust.

What I claim as my invention is:

1. In a storage battery, a negative active material containing a small percentage of lead dust as an admixture thereto, as set forth.

2. In a storage battery, a negative pole electrode, comprising negative active material containing a small percentage of lead dust as an admixture thereto, and a pair of perforated lead plates inclosing said negative active material, forming a combined grid and containing envelop for the same, as set forth.

3. In a storage battery, a negative element comprising a perforated envelop member, active material completely filling said envelop member, said active material containing a small percentage of lead dust.

Signed by me at Chicago, Illinois, this 1st day of August, 1907.

EDWARD SOKAL.

Witnesses:
 Sarah Lewis,
 Albert John Sauser.